(12) United States Patent
Brandler

(10) Patent No.: US 11,091,251 B2
(45) Date of Patent: Aug. 17, 2021

(54) TELESCOPING SHOCK STRUT FOR LANDING GEAR

(71) Applicant: Lockheed Martin Corporation, Bethesda, MD (US)

(72) Inventor: Richard Brandler, Newtown, CT (US)

(73) Assignee: Lockheed Martin Corporation, Bethesda, MD (US)

( * ) Notice: Subject to any disclaimer, the term of this patent is extended or adjusted under 35 U.S.C. 154(b) by 282 days.

(21) Appl. No.: 16/197,831

(22) Filed: Nov. 21, 2018

(65) Prior Publication Data

US 2020/0156772 A1  May 21, 2020

(51) Int. Cl.
| | | |
|---|---|---|
| *B64C 25/60* | (2006.01) | |
| *B64C 25/62* | (2006.01) | |
| *F16F 9/06* | (2006.01) | |
| *B64C 25/32* | (2006.01) | |

(52) U.S. Cl.
CPC .............. *B64C 25/60* (2013.01); *B64C 25/62* (2013.01); *F16F 9/06* (2013.01); *F16F 9/063* (2013.01); *B64C 2025/325* (2013.01)

(58) Field of Classification Search
CPC .......... B64C 25/60; B64C 25/58; F16F 9/063; F16F 9/064; F16F 9/067; F16F 9/165
See application file for complete search history.

(56) References Cited

U.S. PATENT DOCUMENTS

| | | | |
|---|---|---|---|
| 2,106,289 A | 1/1938 | Wallace | |
| 3,724,832 A | 4/1973 | Ceska | |
| 3,997,133 A * | 12/1976 | Fagan | B64C 25/60 244/104 R |
| 4,648,490 A * | 3/1987 | Bergloff | B64C 25/60 188/297 |
| 8,967,346 B2 * | 3/2015 | Polakowski | F16F 9/3242 188/297 |
| 2004/0094376 A1 * | 5/2004 | van Wonderen | F16F 9/48 188/285 |
| 2005/0034942 A1 * | 2/2005 | Bugaj | F16F 9/56 188/297 |
| 2011/0296981 A1 * | 12/2011 | Chou | F16F 9/346 92/9 |
| 2014/0291085 A1 | 10/2014 | Bandy | |
| 2016/0207616 A1 | 7/2016 | Lindahl et al. | |

* cited by examiner

*Primary Examiner* — Assres H Woldemaryam
(74) *Attorney, Agent, or Firm* — Michael Best & Friedrich LLP

(57) ABSTRACT

A shock strut includes a first piston having a first hollow interior and a second piston having a second hollow interior. The first piston is movably mounted to the second piston. The shock strut additionally includes a housing having a third hollow interior, and the second piston is movably mounted to the housing. In response to application of a force to the shock strut, the first piston is receivable within the second piston during a first stage of compression and together, the first piston and the second piston are receivable within the housing during a second stage of compression.

20 Claims, 5 Drawing Sheets

TELESCOPING SHOCK STRUT FOR LANDING GEAR

BACKGROUND

The embodiments herein relate to landing gear assemblies for aircraft and, more particularly, to a shock absorbing strut for a landing gear assembly of a rotary wing aircraft.

The landing gear system of an aircraft is typically the first element of the aircraft to impact the ground during both normal and crash landings. Accordingly, landing gear systems are typically designed to attenuate or dissipate the large impact energy experienced in a crash landing situation. The shock struts of existing landing gear systems typically require a large amount of displacement or stroke to accommodate the dissipation of the large energies experienced during a hard landing. However, the space constraints of the aircraft limit the amount of stroke and therefore the energy attenuation capability of the shock strut. There is therefore a need to provide a shock strut which can provide more stroke and greater energy attenuation in a limited space.

BRIEF DESCRIPTION

According to an embodiment, a shock strut includes a first piston having a first hollow interior and a second piston having a second hollow interior. The first piston is movably mounted to the second piston. The shock strut additionally includes a housing having a third hollow interior, and the second piston is movably mounted to the housing. In response to application of a force to the shock strut, the first piston is receivable within the second piston during a first stage of compression and together, the first piston and the second piston are receivable within the housing during a second stage of compression.

In addition to one or more of the features described above, or as an alternative, in further embodiments the third hollow interior further comprises a first chamber and a second chamber, the second piston being movably mounted within the second chamber.

In addition to one or more of the features described above, or as an alternative, in further embodiments comprising a passage fluidly coupling the first chamber and the second chamber, the second piston extending through the first chamber.

In addition to one or more of the features described above, or as an alternative, in further embodiments comprising a floating piston movably mounted within the first chamber, the floating piston being mounted concentrically with the second piston.

In addition to one or more of the features described above, or as an alternative, in further embodiments the first chamber is filled with a pressurized fluid and the second chamber is filled with a viscous liquid.

In addition to one or more of the features described above, or as an alternative, in further embodiments the second hollow interior is fluidly coupled to the second chamber.

In addition to one or more of the features described above, or as an alternative, in further embodiments comprising another floating piston movably mounted within the first hollow interior.

In addition to one or more of the features described above, or as an alternative, in further embodiments the first hollow interior is filled with a pressurized fluid.

In addition to one or more of the features described above, or as an alternative, in further embodiments the pressurized fluid within the first hollow interior and the pressurized fluid within the first chamber are identical.

In addition to one or more of the features described above, or as an alternative, in further embodiments the first stage of compression and the second stage of compression occur in series.

According to another embodiment, a landing gear assembly includes a ground contact assembly including at least one ground contact element and a landing gear strut affixed at a first end to the ground contact assembly. The landing gear strut includes a first piston, a second piston, and a housing. The first piston is movably mounted to the second piston and the second piston is movably mounted to the housing. During operation, the landing gear strut has a first stage of compression and a second stage of compression occurring in series.

In addition to one or more of the features described above, or as an alternative, in further embodiments the first piston is receivable within a hollow interior of the second piston during the first stage of compression.

In addition to one or more of the features described above, or as an alternative, in further embodiments the second piston is receivable within a hollow interior of the housing during the second stage of compression.

In addition to one or more of the features described above, or as an alternative, in further embodiments the first piston is nested within the second piston during the second stage of compression.

In addition to one or more of the features described above, or as an alternative, in further embodiments the landing gear assembly is part of a rotary wing aircraft.

According to yet another embodiment, a method of operating a shock strut includes applying a force to an end of a first piston of the shock strut, receiving the first piston within a hollow interior of a second piston of the shock strut such that the first piston and the second piston are nested, and receiving the nested first piston and second piston within a housing of the shock strut.

In addition to one or more of the features described above, or as an alternative, in further embodiments the first piston includes a pressurized fluid and receiving the first piston within the hollow interior of the second piston compresses the pressurized fluid within the first piston.

In addition to one or more of the features described above, or as an alternative, in further embodiments the second piston is arranged in fluid communication with the first piston and housing.

In addition to one or more of the features described above, or as an alternative, in further embodiments the housing includes a first chamber and a second chamber, the first chamber being filled with a pressurized fluid, wherein receiving the nested first piston and second piston within the housing compresses the pressurized fluid within the first chamber.

In addition to one or more of the features described above, or as an alternative, in further embodiments the second chamber is filled with a liquid and receiving the nested first piston and second piston within the housing forces a portion of the liquid from the second chamber into the first chamber.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
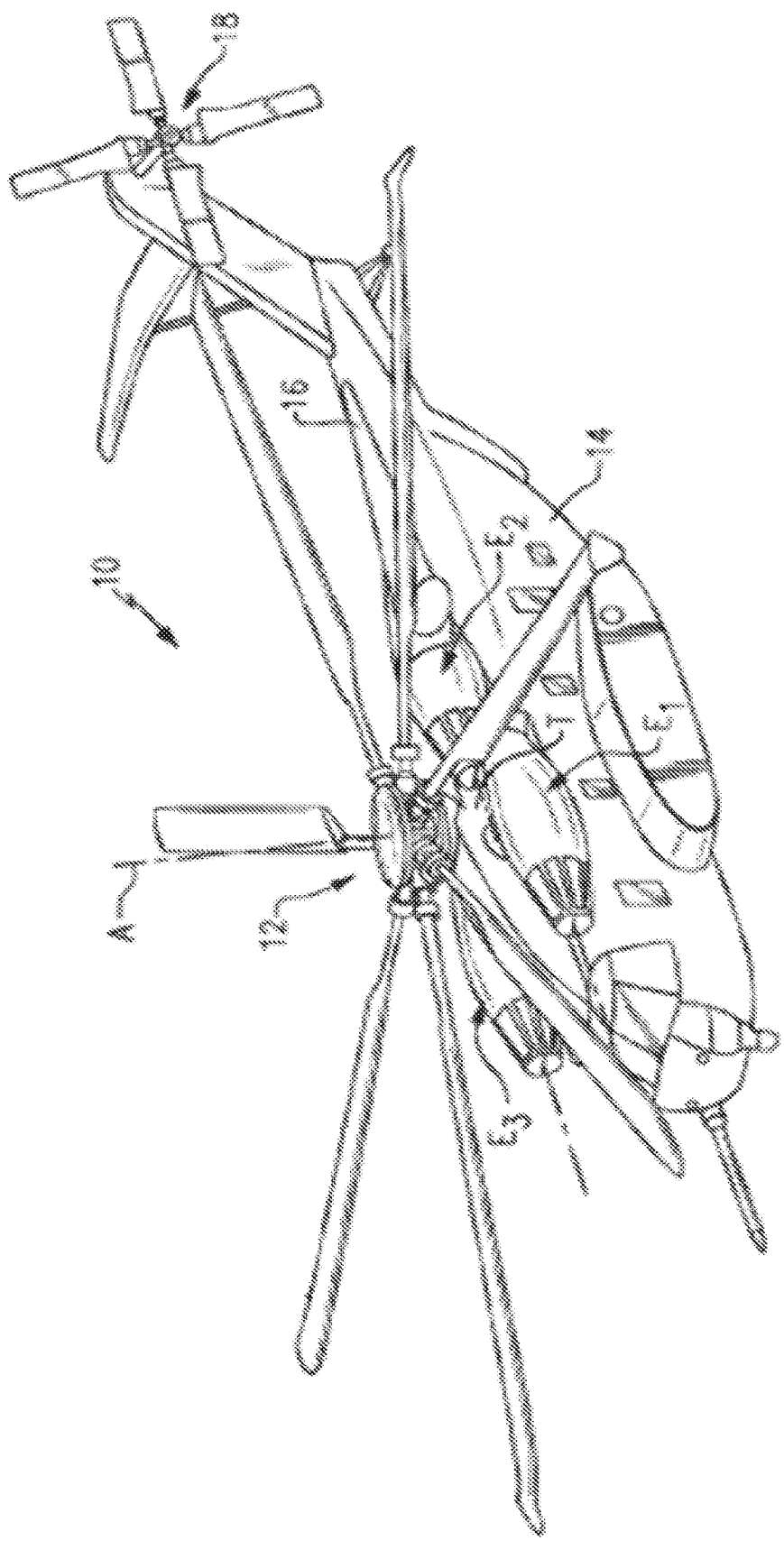
FIG. 1 is a perspective view of an example of a rotary-wing aircraft in an exemplary embodiment.

Referring to FIG. 1, schematically illustrated is a rotary-wing aircraft 10 having a main rotor system 12 in an exemplary embodiment. The aircraft 10 includes an airframe 14 having an extending tail 16 which mounts a tail rotor system 18, such as an anti-torque system. The main rotor system 12 is driven about an axis A through a main power transmission gearbox, illustrated schematically at T, by one or more engines E. The aircraft 10 employs at least one landing gear assembly 20 (see FIG. 2) during landing and while performing land-based maneuvers on a ground surface. Although a particular helicopter configuration is illustrated and described in the disclosed embodiment, other configurations and/or machines, such as ground vehicles, jet aircraft, turbofan engines, high speed compound rotary wing aircraft with supplemental translational thrust systems, dual contra-rotating, coaxial rotor system aircraft, quad-copier, multi-rotor lifting bodies, turbo-props, tilt-rotors and tilt-wing aircraft, and the like may also benefit from the embodiments described herein. Aircraft 10 may be a piloted (e.g., a manned aircraft), an unmanned aerial vehicle, optimally piloted vehicle, etc.

Figure 2:
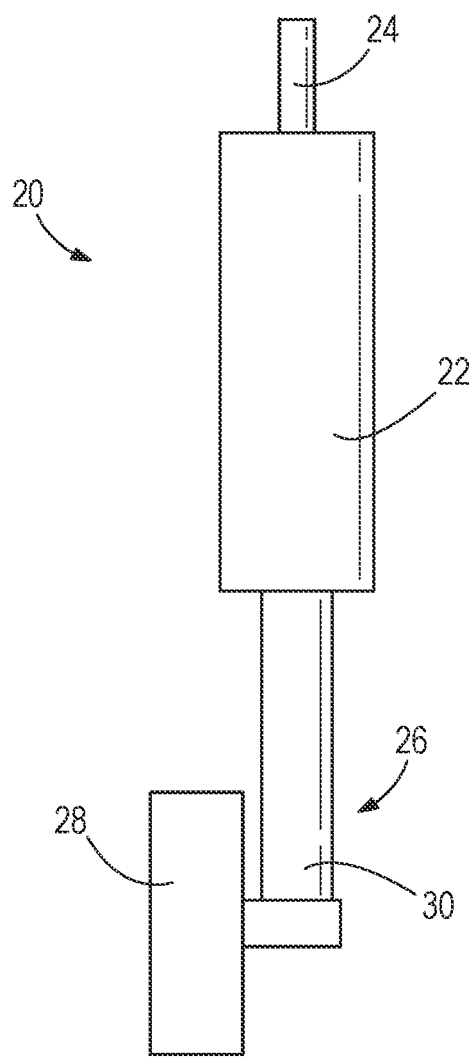
FIG. 2 is a front view of an example of a landing gear assembly according to an embodiment.

An example of a landing gear assembly 20 is illustrated in more detail in FIG. 2. As shown, the landing gear assembly 20 includes landing gear support 22 coupled at a first end 24 to a portion of an aircraft, such as airframe 14 for example. A ground contact assembly 26, including at least one ground contact element 28, is mounted to a second, opposite end 30 of the landing gear support 22. The at least one ground contact element 28 is typically a wheel and tire assembly. In the illustrated, non-limiting embodiment, the ground contact assembly 26 includes a single ground contact element 28 coupled to a landing gear support 22. However, it should be understood that embodiments where the ground contact assembly 26 includes two or more ground contact elements 28 are also within the scope of the disclosure.

Figure 3:
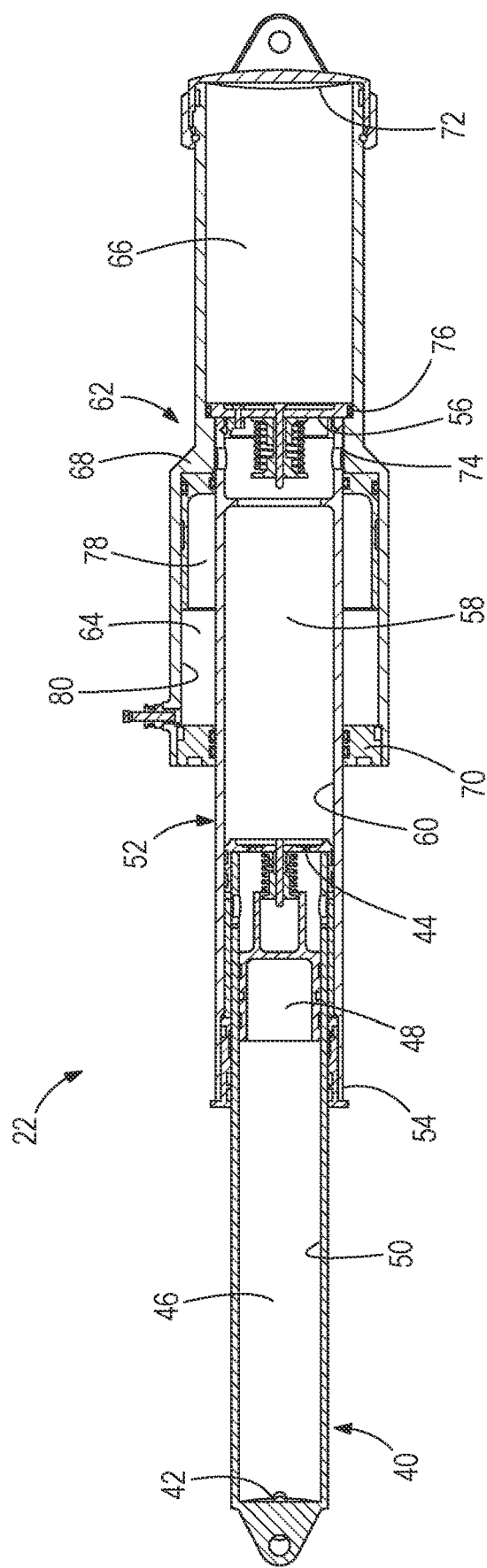
FIG. 3 is a cross-sectional view of a landing gear support in an extended configuration according to an embodiment.
Figure 4:
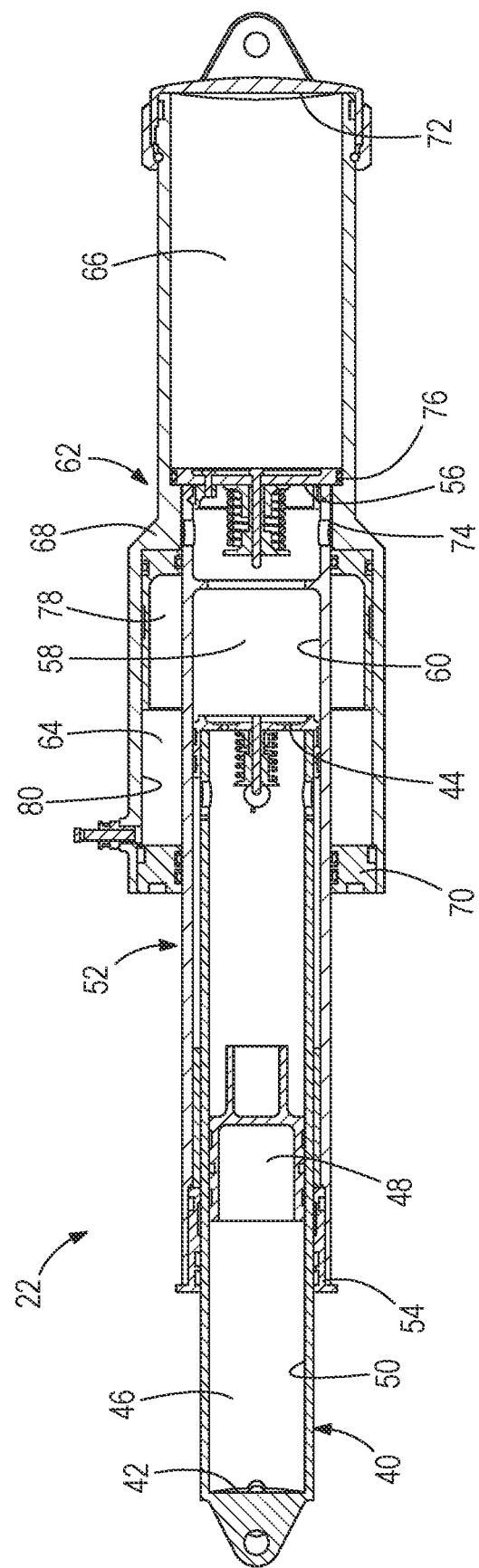
FIG. 4 is a cross-sectional view of the landing gear support of FIG. 3 in a partially compressed configuration according to an embodiment.
Figure 5:
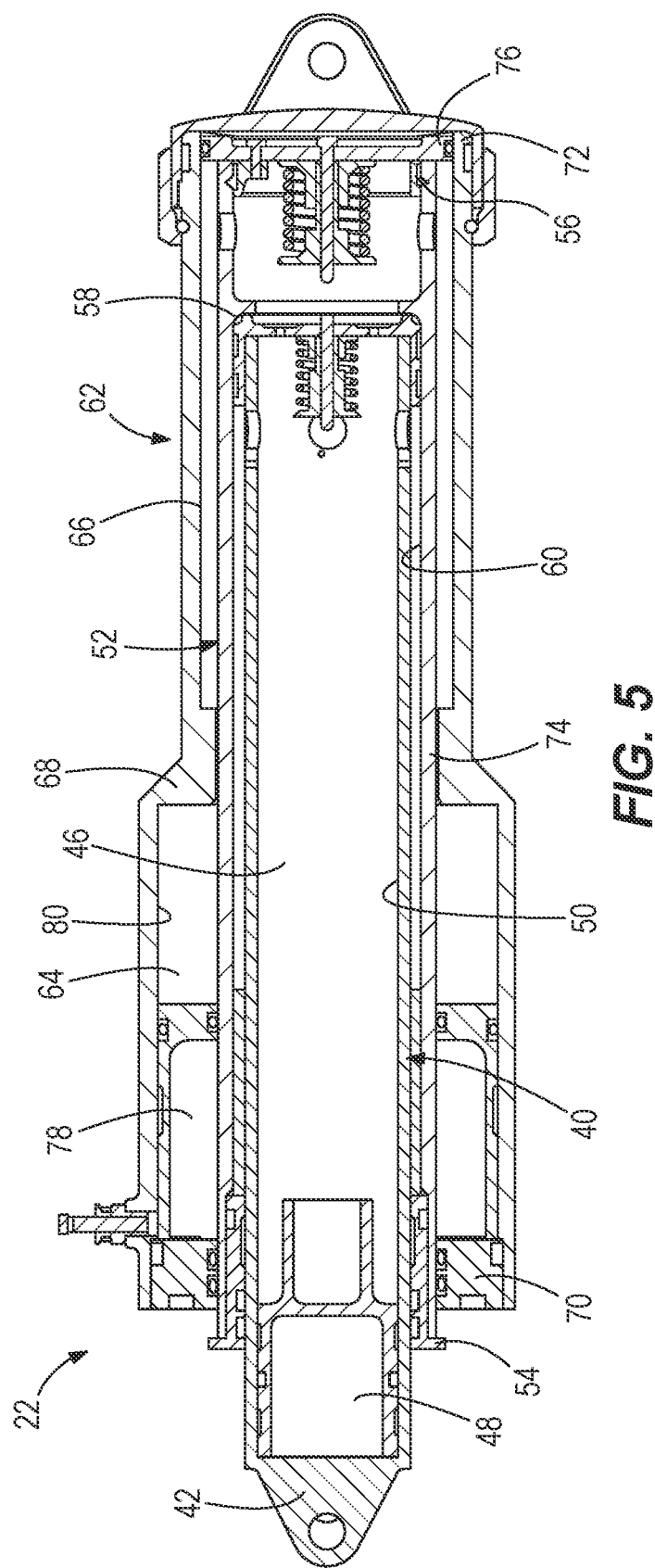
FIG. 5 is a cross-sectional view of the landing gear support of FIG. 3 in a fully compressed configuration according to an embodiment.

With reference now to FIGS. 3-5, a landing gear support 22 according to an embodiment is illustrated in more detail. The landing gear support 22 includes a first piston 40 having a sealed end 42 and an open end 44. The ground contact assembly 26 is connected either directly or indirectly to the sealed end 42 of the first piston 40. The first piston 40 may be generally cylindrical in shape and has a substantially hollow interior 46. A floating piston 48 is disposed within the hollow interior 46 of the first piston 40. In an embodiment, an outer diameter of the floating piston 48 is substantially identical to the hollow interior 46 of the first piston 40. As a result, the floating piston 48 is able to translate within the hollow interior 46 between the sealed end 42 and the open end 44 of the first piston 40, while maintaining sealing contact with the interior sidewall 50 thereof.

The landing gear support additionally includes a second piston 52 having a first end 54 and a second end 56. The second piston 52 may also be generally cylindrical in shape and has a substantially hollow interior 58. In the illustrated, non-limiting embodiment, the second piston 52 is mounted concentrically with the first piston 40. As shown, the open end 44 of the first piston 40 is positioned within the hollow interior 58 of the second piston 52 such that the first piston 40 extends through the first end 54 of the second piston 52. Accordingly, the hollow interior 46 of the first piston 40 is arranged in fluid communication with the hollow interior 58 of the second piston 52. In an embodiment, the outer diameter of the first piston 40 is substantially identical to the inner diameter of the hollow interior 58 of the second piston 52. As a result, the first piston 40 is able to translate within the hollow interior 58 of the second piston 52, while maintaining sealing contact with the interior sidewall 60 thereof.

The first piston 40 is movable relative to the second piston 52 between a first position and a second position. In the illustrated, non-limiting embodiment, when the first piston 40 is in the first position, the open end 44 of the first piston 40 is arranged near a central portion of the hollow interior 58 of the second piston 52. In the second position, the open end 44 of the first piston 40 is arranged generally adjacent the second end 56 of the second piston 52. Accordingly, the first piston 40 is configured to telescope or retract into the hollow interior 58 of the second piston 52.

A housing 62 of the landing gear support 22 includes a generally hollow interior having a first internal chamber 64 and a second internal chamber 66 disposed on opposing sides of an internal stop 68. The first chamber 64 is positioned generally adjacent a first end 70 of the housing 62 and the second chamber 66 is located adjacent a second, opposite end 72 of the housing 62. In an embodiment, a passage 74 extends through the internal stop 68 to fluidly couple the first and second chamber 64, 66.

The diameter of the first chamber 64 may be different than the diameter of the second chamber 66. For example, the diameter of the second chamber 66 may be smaller than the diameter of first chamber 64, as shown in the FIGS. However embodiments where the diameter of the second chamber 66 is greater than the diameter of the first chamber 64, or where the diameters of the first and second chambers 64, 66 are equal, are also contemplated herein. Further, in an embodiment, the diameter of the passage 74 extending between the first chamber 64 and the second chamber 66 is smaller than the diameter of both the first chamber 64 and the second chamber 66.

The second piston 52 is movably mounted to the housing 62. In an embodiment, an outer diameter of the second piston 52 is less than or generally equal to the diameter of the passage 74 formed in the housing 62. As shown, the second end 56 of the second piston 52 is positioned within the second chamber 66 of the housing 62 such that the second piston 52 extends through both the first chamber 64 and the passage 74. In an embodiment, the hollow interior 58 of the second piston 52 is arranged in fluid communication with second chamber 66 of the housing 62 via the second end 56 thereof.

The second piston 52 is configured to translate or slide relative to the housing 62 between a first position and a second positon. In an embodiment, a flange 76 mounted to the second end 56 of the second piston 52 has a diameter generally equal to the diameter of the second chamber 66. Because the diameter of the flange 76 is greater than the diameter of the passage 74, the flange 76 restricts movement of the second end 56 of the second piston 52 from within the second chamber 66. When the second piston 52 is in the first position, best shown in FIG. 3, the flange 76 is arranged at an end of the second chamber 66, generally in contact with the internal stop 68. When the second piston 52 is in the second position, shown in FIG. 5, the flange 76 is arranged at an opposite end of the second chamber 66 adjacent the second end 72 of the housing 62.

Another floating piston 78 is disposed within the first chamber 64 of the housing 62. In an embodiment, an outer diameter of the floating piston 78 is substantially identical to the inner diameter of the first chamber 64. As a result, the floating piston 78 is able to translate within the first chamber 64 while maintaining sealing contact with the interior sidewall 80 thereof.

In an embodiment, the landing gear support 22 functions as a shock absorber, also known as an oleo for the landing gear assembly 20. Accordingly, the landing gear support 22 is configured telescope in response to application of a force to the ground contact assembly 26. In the illustrated, non-limiting embodiment, the landing gear support 22 includes two separate stages of operation. More specifically, during the first stage, the first piston 40 is slidably received within the hollow interior 58 of the second piston 52, and during the second stage, the second piston 52 is slidably received within the second chamber 66 of the housing 62. The first stage and the second stage of operation of the landing gear support 22 occur sequentially rather than simultaneously.

Each of the plurality of hollow interiors and chambers is filled with a correspondent fluid to cushion the impact applied to the ground contact assembly 26. The hollow interior 46 of the first piston 40 extending between the sealed end 42 and the floating piston 48 is filled with a pressurized compressible fluid such as air or nitrogen for example. Similarly the portion of the first chamber 64 extending between the first end 70 of the housing 62 and the floating piston 78 is also filled with a pressurized, compressible fluid. It should be understood that the pressurized, compressible fluid within the first piston 40 and the pressurized, compressible fluid within the first chamber 64 of the housing 62 may, but need not be identical. In addition, the second chamber 66 of the housing 62, the hollow interior of 58 of the second piston 52, and the hollow interior 46 of the first piston 40 between the floating piston 48 and the open end 44 are filled with a viscous, generally uncompressible fluid, such as oil for example.

Prior to landing, the landing gear support 22 is normally in an extended position, as shown in FIG. 3. Application of a force to the ground contact assembly 26 coupled to the sealed end 42 of the first piston 40 causes the first piston 40 to translate into the second piston 52. The movement of the first piston 40 relative to the second piston 52 defines the stroke of the first compression stage of the landing gear strut 22. As the first piston 40 is received within the hollow interior 58 of the second piston 52, a pressure is applied to the oil within the second piston 52. As the pressure in the hollow interior 58 containing oil is increased, the oil applies a force to the floating piston 48, thereby compressing the pressurized fluid within the hollow interior 46 of the first piston 40. Once the first piston 40 is fully seated within the hollow interior 58 of the second piston 52, i.e. the first stage of compression of the landing gear support 22 is complete, continued application of a force to the ground contact assembly 26 causes the nested first piston 40 and second piston 52 to retract into the housing 62. The movement of the first and second piston 40, 52 relative to the housing 62 defines the stroke of the second compression stage of the landing gear strut 22. As the nested first and second piston 40, 52 slide into the second chamber 66 of the housing 62, the pressure in the second chamber 66 containing oil is increased. Accordingly, a portion of the oil will flow through the passage to apply a force to the floating piston 78, thereby compressing the pressurized fluid within the first chamber 64 of the housing 62. When positioned within the housing 62, the nested first piston 40 and second piston 52 are concentric with the housing 62.

Upon removal of the force from the ground contact assembly 26, the force of the compressed pressurized fluid in the first chamber 64 will cause the floating piston 78 to translate within the first chamber 64, and the oil within the first chamber 64 to return to the second chamber 66. As the oil returns to the second chamber 66, the oil pushes the second piston 52 out of the second chamber 66. Similarly, the force of the compressed pressurized fluid in the hollow interior 46 of the first piston 40 will cause the floating piston 48 to translate within the first hollow interior such that the oil is returned to the hollow interior 58 of the second piston 52. As the oil returns to the hollow interior 58 of the second piston 52, the oil pushes the first piston 40 out of the hollow interior 58 of the second piston 52.

By positioning the first chamber 64 of pressurized fluid concentrically with the second piston 52, a landing gear support 22 as illustrated and described herein has a reduced length compared to existing shock struts. The landing gear strut 22 may have a single oil chamber or multiple oil chambers, the former providing a reduction in labor required for servicing compared to traditional shock struts.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling w the scope of the claims.

What is claimed is:
1. A shock strut comprising:
a first piston having a first hollow interior;
a second piston having a second hollow interior, the first piston being moveably mounted to the second piston; and a housing having a third hollow interior, the second piston being movably mounted to the housing, wherein in response to application of a force to the shock strut, the first piston is receivable within the second piston during a first stage of compression and together, the first piston and the second piston are receivable within the housing during a second stage of compression;

wherein the second hollow interior is fluidly coupled to the third hollow interior.

2. The shock strut of claim 1, wherein the third hollow interior further comprises a first chamber and a second chamber, the second piston being moveably mounted within the second chamber.

3. The shock strut of claim 2, further comprising a passage fluidly coupling the first chamber and the second chamber, the second piston extending through the first chamber.

4. The shock strut of claim 3, further comprising a floating piston movably mounted within the first chamber, the floating piston being mounted concentrically with the second piston.

5. The shock strut of claim 4, wherein the first chamber is filled with a pressurized fluid and the second chamber is filled with a viscous liquid.

6. The shock strut of claim 5, wherein the second hollow interior is fluidly coupled to the second chamber.

7. The shock strut of claim 5, further comprising another floating piston movably mounted within the first hollow interior.

8. The shock strut of claim 7, wherein the first hollow interior is filled with a pressurized fluid.

9. The shock strut of claim 8, wherein the pressurized fluid within the first hollow interior and the pressurized fluid within the first chamber are identical.

10. The shock strut of claim 1, wherein the first stage of compression and the second stage of compression occur in series.

11. A landing gear assembly comprising:
a ground contact assembly including at least one ground contact element; and
a landing gear strut affixed at a first end to the ground contact assembly, wherein the landing gear strut includes:
a first piston;
a second piston, the first piston being movably mounted to the second piston; and
a housing, the second piston being movably mounted to the housing, wherein during operation, the landing gear strut has a first stage of compression and a second stage of compression, the first stage of compression and the second stage of compression occurring in series.

12. The landing gear assembly of claim 11, wherein the first piston is receivable within a hollow interior of the second piston during the first stage of compression.

13. The landing gear assembly of claim 12, wherein the second piston is receivable within a hollow interior of the housing during the second stage of compression.

14. The landing gear assembly of claim 13, wherein the first piston is nested within the second piston during the second stage of compression.

15. The landing gear assembly of claim 11, wherein the landing gear assembly is part of a rotary wing aircraft.

16. A method of operating a shock strut comprising:
applying a force to an end of a first piston of the shock strut;
receiving the first piston within a hollow interior of a second piston of the shock strut such that the first piston and the second piston are nested; and
receiving the nested first piston and second piston within a housing of the shock strut;
wherein the second piston is arranged in fluid communication with the housing.

17. The method of claim 16, wherein the first piston includes a pressurized fluid and receiving the first piston within the hollow interior of the second piston compresses the pressurized fluid within the first piston.

18. The method of claim 16, wherein the second piston is further arranged in fluid communication with the first piston.

19. The method of claim 16, wherein the housing includes a first chamber and a second chamber, the first chamber being filled with a pressurized fluid, wherein receiving the nested first piston and second piston within the housing compresses the pressurized fluid within the first chamber.

20. The method of claim 19, wherein the second chamber is filled with a liquid and receiving the nested first piston and second piston within the housing forces a portion of the liquid from the second chamber into the first chamber.

* * * * *